United States Patent [19]

Huber

[11] 4,013,581

[45] Mar. 22, 1977

[54] BLEACH TABLET COMPOSITION

[75] Inventor: Arthur Elmer Huber, Cincinnati, Ohio

[73] Assignee: The Procter & Gamble Company, Cincinnati, Ohio

[22] Filed: July 10, 1975

[21] Appl. No.: 594,910

[52] U.S. Cl. .............................. 252/186; 252/188

[51] Int. Cl.[2] ..................... C01B 13/00; C09K 3/00

[58] Field of Search ............................ 252/186, 188

[56] References Cited

UNITED STATES PATENTS

| | | | |
|---|---|---|---|
| 3,146,168 | 8/1964 | Battista | 167/82 |
| 3,855,257 | 12/1974 | Pultinas | 260/413 |

FOREIGN PATENTS OR APPLICATIONS

| | | | |
|---|---|---|---|
| 635,620 | 1/1962 | Canada | 252/186 |
| 847,702 | 9/1960 | United Kingdom | 252/186 |

*Primary Examiner*—Samuel W. Engle
*Assistant Examiner*—Donald P. Walsh
*Attorney, Agent, or Firm*—Charles R. Wilson; Jerry J. Yetter; Julius P. Filcik

[57] ABSTRACT

Peroxygen bleaches, especially diperazelaic acid, are provided in tablet form useful for bleaching fabrics.

10 Claims, No Drawings

BLEACH TABLET COMPOSITION

BACKGROUND OF THE INVENTION

The present invention relates to stable bleaching tablets. More particularly, tablets comprising diperazelaic acid, or the like, as the active bleaching material together with agents which contribute to the shelf life, thermal stability and proper disintegration rate of the tablets are provided.

The most familiar method of bleaching fabrics to remove stains, especially in the context of a home laundering operation, is to add an oxidizing bleach directly to the laundering liquor. Liquid chlorine (as hypochlorite) solutions are usually employed, but granular peroxygen bleaches are also commercially available. The addition of a bleaching agent to a laundering bath in conjunction with a detergent has the distinct advantage of providing the desired bleaching action concurrently with fabric laundering.

The present invention relates to the use of peroxygen compounds, especially diperazelaic acid, to bleach fabrics in an aqueous bath. Peroxygen compounds offer considerable advantages as bleaches over the more common chlorine bleaches, since they are milder and do not undesirably interact with fabrics and dyes when properly used.

In spite of the inherent advantages of many peroxygen bleaches over chlorine bleaches, the peroxygen bleaches currently being marketed are not as effective as the chlorine bleaches. Other, more effective peroxygen bleaches are known but have not been made available to the consumer heretofore, since many of these more effective (from a bleaching standpoint) peroxygen bleaches suffer from a variety of problems which could not be tolerated in home usage. For example, some highly effective peroxygen bleaches are too flammable and pose safety problems; other peroxygen bleaches are quite expensive; a common problem with most peroxygen bleaches is their lack of stability on prolonged storage. Whatever the reason, the more highly effective peroxygen bleaches are not currently available for use in the home.

By the present invention it has been discovered that useful bleaches can be provided by tableting peroxygen compounds in the manner disclosed hereinafter. The tableted bleaches herein are stable, safe and effective and are specifically designed for home use in a typical fabric laundering situation.

PRIOR ART

The following references generally relate to peroxygen compounds and their use as oxidizing agents and/or bleaches: Canadian Patent 635,620 to H. W. McCune, issued January 30, 1962; British Patent 847,702, issued September 14, 1960; W. E. Parker, et al., *J. Am. Chem. Soc.*, 79, 1929 (1957); E. Searles, PREPARATION, PROPERTIES, REACTIONS AND USE OF ORGANIC PERACIDS AND THEIR SALTS, FMC Corp., New York (1964); and D. Swern (ed.) ORGANIC PEROXIDES, Vol. I, Wiley Interscience, N.Y. (1970).

SUMMARY OF THE INVENTION

The present invention encompasses bleaching tablets which can be used to remove stains from fabrics, and the like. The tablets herein are used in an aqueous medium, e.g., in a laundering liquor or rinse bath at pH's above about 6, and rapidly disintegrate to provide an even bleaching action without damage to fabrics or dyes.

DETAILED DESCRIPTION OF THE INVENTION

The bleach tablets of this invention comprise:

a. an effective amount of a peroxygen bleach (especially diperazelaic acid, or a salt thereof);
b. sufficient sodium sulfate to prevent deflagration to the peroxygen bleach; and
c. an amount of a tablet disintegrating agent sufficient to provide rapid and complete disintegration of the bleach tablet on contact with water.

The bleach tablets herein can also contain various peroxygen bleach-compatible materials such as magnesium stearate which is used as a release agent in the tableting process. Preferred tablets also contain chelators to sequester metal ions which can cause decomposition of the peroxygen bleach.

The tableted bleach compositions herein comprise multiple ingredients which are described in detail hereinafter.

The tableting process herein can be used to advantage with any of a variety of solid peroxygen bleaches. Accordingly, the peroxygen bleaching compounds used in the present bleach tablets can be any of the well-known organic peroxides such as: the alkyl, alkenyl, alkynyl, cycloalkyl, cycloalkenyl, aralkyl, aralkenyl and heterocyclic hydroperoxides; the acyclic, cycloalkyl and aralkyl $\alpha$-oxyhydroperoxides and the gem-dihydroperoxides; the cyclic peroxides such as 1,2,4-trioxacyclopentane; the $\alpha$-oxyperoxides; the $\alpha$-oxoperoxides; the $\alpha,\alpha'$-dioxyperoxides and $\alpha,\alpha'$-diperoxyperoxides; the $\alpha,\alpha'$-dioxoperoxides; and the $\alpha,\alpha'$-dialkoxy-$\alpha,\alpha'$-dioxoperoxides, well known in the scientific literature. For typical and detailed listings of such compounds, see ORGANIC PEROXIDES THEIR FORMATION AND REACTIONS, E. G. E. Hawkins, D. Van Nostrand Company, Inc., 1961, incorporated herein by reference.

It is to be understood that the bleaching tablets can be prepared with any of the foregoing types of solid peroxides as the peroxygen bleaching agent. However, it will be appreciated that certain organic peroxides are expensive; others are difficult to prepare on a commercial scale; still others are overly toxic or decompose to toxic and/or malodorous or otherwise undesirable byproducts. While such factors are not important to the functioning of the tablets, they must be considered when selecting preferred peroxides for home use as bleaches.

The most highly preferred peroxides for use as the peroxygen bleaching agent in the present compositions are the solid peroxyacids. Peroxyacids are conveniently prepared by the reaction of carboxylic acids with hydrogen peroxide in the presence of sulfuric acid, and many such materials are commercially available. The peroxyacids, as a class, are quite effective bleaches.

Typical monoperoxyacids (i.e., prepared from monocarboxylic acids) useful herein include alkyl peroxyacids, alkenyl peroxyacids and aryl peroxyacids. Nonlimiting examples of peroxyacids useful herein include peroxymyristic acid, peroxystearic acid, peroxyoleic acid and peroxy-$\alpha$-naphthoic acid.

Typical diperoxyacids (i.e., prepared from dicarboxylic acids) useful herein include alkyl diperoxyacids, alkenyl diperoxyacids and aryl diperoxyacids. Nonlimiting examples of diperoxyacids useful herein include diperazelaic acid, diperbrassylic acid, dipersebacic acid, and diperisophthalic acid. The diperoxyacids are preferred over the monoperoxyacids in that, on a mole basis, the di-acids provide two equivalents of active oxygen, whereas the mono-acids provide one.

Diperazelaic acid, or its salts, is highly preferred for use herein due to its availability and efficacy as a fabric bleach. Diperazelaic acid can be readily obtained by the reaction of hydrogen peroxide and sulfuric acid with azelaic acid which, in turn, is obtained by the catalytic oxidation of 9,10-dihydroxystearic acid; see U.S. Pat. No: 3,855,257, issued Dec. 17, 1974, to E. P. Pultinas, Jr., incorporated herein by reference.

Sodium sulfate is used as an inert diluent in the instant bleaching tablets. The diluent action of the sodium sulfate is necessary to prevent an unacceptable rise in temperature associated with the contact of the peroxygen bleaches herein and water.

The bleaching tablets herein must disintegrate so that the peroxygen bleach will be evenly and completely distributed throughout the bleaching bath. Since most bleaches are used concurrently with fabric laundering, disintegration of the tablets must be rapid so that the peroxygen bleach is dispersed throughout the bath during the initial stages of the washing step of a typical laundering cycle. On the other hand, the tablets must not be unduly fragile and should be able to withstand shipment in commerce without flaking or crumbling.

Moreover, the bleaching tablets provided herein will typically be of a fairly substantial size in order to provide sufficient peroxygen bleach for an average washer load. In general, the bleach tablets herein are from about 2 in. to about 4 in. in diameter and from about 0.25 in. to about 1 in. in thickness.

With the foregoing considerations in mind, it will be appreciated that the selection of appropriate "disintegrating agents" or "aids" for the bleach tablets herein is critical to the successful execution of a product of this type.

The tablet disintegrating agents used to prepare the bleach tablets herein must be selected with the requirements of rapid disintegration rate coupled with tablet stability in mind. Moreover, the agents must be compatible with the peroxygen bleach. Many tableting agents are naturally contaminated with heavy metal ions which can contribute to peroxygen bleach decomposition on storage; such materials, e.g., clays, are not used herein. Other agents, such as the various water-insoluble silicas, can deposit on laundered fabrics as unacceptable powders or flecks; such materials are also avoided herein. Still other agents can react/decompose on contact with peroxygen bleaches and traces of moisture, and such agents are also avoided herein.

It has now been discovered that mixtures of microfine, free-flowing starch and microcrystalline cellulose can be combined with solid peroxygen bleaches and sodium sulfate to provide tablets which are storage-stable, durable, and yet rapidly disintegrate and disperse on contact with water.

Surprisingly, neither the starch nor the microcrystalline cellulose, alone, provides the combination of properties required for a truly effective and useful bleaching tablet of the present type.

Both the free-flowing starch and the microcrystalline cellulose employed in the present tablets are well-known in the tablet making art and are commonly used, for example, in the pharmaceutical industry to prepare aspirin tablets, and the like.

A typical free-flowing starch used herein is available from A. E. Staley Mfg. Co., Decatur, Ill., as STA-$R_x$ 1500 Starch. This starch is described in the Staley Technical Information Catalog No. 14 076070, the disclosures of which are incorporated herein by reference. Positive identification of this starch can be made by conducting tests for moisture content, ash, pH, and the standard starch iodine test, all as set forth in the Staley technical catalog. A minimum of 90.0% of this starch passes through a 100 mesh U.S. sieve.

Other free-flowing starches whose physical properties correspond to those of STA-$R_x$ 1500 Starch can also be used herein.

The microcrystalline cellulose employed herein corresponds to materials commonly used in the preparation of vitamin C (ascorbic acid) tablets. A typical microcrystalline cellulose used herein is AVICEL, available from FMC Corporation, American Viscose Division, AVICEL Sales, Marcus Hook, Pennsylvania 19061, and is described in the Avicel Applications Bulletin No. 2 4/70-1M, the disclosures of which are incorporated herein by reference. Preparation of pharmaceutical compositions using cellulose crystalline aggregates of the Avicel type and a further description of this type of tableting agent are found in U.S. Pat. No. 3,146,168, issued Aug. 25, 1964, assigned to FMC Corporation, the disclosures of which are incorporated herein by reference.

Several Avicel-type products are available (e.g., Avicel-PH-101 and Avicel-PH-102) and can be used herein. These materials are more fully described in the Avicel PH bulletin No. PH-1 4/72-1M, FMC Corporation, the disclosures of which are incorporated herein by reference.

Other microcrystalline celluloses whose physical properties correspond to those of AVICEL can also be used herein.

The bleaching tablets herein will optionally, and preferably, contain a chelating agent which sequesters metal ions. As is well known in the bleaching arts, various di- and polyvalent metals contribute substantially to the rate of decomposition of peroxygen bleaches. Accordingly, it is well known in the art that chelating agents which sequester such metal ions (e.g., iron, copper, magnesium, manganese, and the like) are commonly added to peroxygen bleaches to scavenge these ions, thereby enhancing product stability. In similar fashion, the bleach tablets herein are advantageously stabilized to undesirable bleach decomposition by the presence of such chelating agents.

A wide variety of chelating agents are known in the art for use in stabilizing peroxygen bleaches, especially hydrogen peroxide and the like. Such chelating agents are also useful herein. Representative examples of such materials include both the free acid form and the water-soluble (usually sodium) salts of: ethylenediaminetetraacetic acid; ethane-1-hydroxy-1,1-diphosphonic acid; nitrilotriacetic acid; ethane-1-hydroxy-1,1,2-triphosphonic acid; citric acid; succinic acid; mellitic acid; benzene pentacarboxylic acid; and the like. Ethylenediaminetetraacetic acid and the water-soluble salts thereof, especially the sodium "EDTA's" are especially preferred for use as stabilizing agents in the present bleaching tablets.

The tablets herein can contain various minor (i.e., less than about 3%, by weight of tablet) components designed to provide additional fabric treating benefits and/or to contribute to product aesthetics. Materials such as dyes, fumigants, perfumes, tablet lubricating aids, and like materials can all be employed as minor components of the tablets herein. Of course, it will be recognized that materials selected for such use are those which do not undesirably interact with the active peroxygen bleach.

The bleach tablets herein are designed to deliver an effective (i.e., stain-removing) amount of the peroxygen bleach to an aqueous bath. More particularly, the tablets herein are designed to provide from about 5 ppm to about 200 ppm, more preferably from about 20 ppm to about 70 ppm, of available oxygen to the aqueous bleaching bath. Of course, the amount of peroxygen bleach needed to deliver this bleaching amount of available oxygen will depend on the total volume of the bath. It is expected that the tablets herein will most generally be employed in the tub of an automatic washer containing from about 17 gallons to about 20 gallons of water. Accordingly, bleach tablets designed for such washer usage will contain from about 8 grams to about 35 grams, more preferably from about 11 grams to about 20 grams, of the peroxygen bleaching compound. Of course, multiple tablets can be used, if desired.

The peroxygen bleaching compound is stabilized by virtue of its being co-present in tablet form with the diluent, sodium sulfate. Tablets containing peroxygen bleaches, especially diperoxyacids, are satisfactorily stabilized at a sodium sulfate: peroxygen bleach weight ratio of from about 3:1 to about 1:3, most preferably about 1:1.

As noted hereinabove, the tablet disintegrating agent employed herein comprises a mixture of microfine, free-flowing starch and microcrystalline cellulose. It is highly preferred that the starch:cellulose weight ratio be in the range from about 5:28 to about 28:5, most preferably about 10:23 to about 23:10, to provide rapidly disintegrating, yet durable tablets of the present type.

The effective amount of the chelator/stabilizer optionally, but preferably, employed in the present tablets will depend somewhat on the amount of peroxygen bleach present therein. The weight ratio of chelator: peroxygen bleach is preferably in the range from about 0.2:100 to about 3:100, most preferably from about 0.3:100 to about 0.6:100.

Highly preferred bleach tablets herein will comprise a mixture of peroxygen bleach (especially diperazelaic acid or the alkali metal salts thereof) and sodium sulfate at a weight ratio of peroxygen bleach: sodium sulfate in the range from about 1:2 to about 2:1; a mixture of microfine, free-flowing starch and microcrystalline cellulose at a weight ratio of starch:cellulose of from about 5:28 to about 28:5, the weight ratio of the mixture of starch and cellulose to the mixture of peroxygen bleach and sodium sulfate being in the range from about 1:5 to about 1:2; and a chelator (especially EDTA, or the sodium salts thereof) present at a weight ratio of chelator: peroxygen bleach in the range from about 0.3:100 to about 0.6:100.

Powdered bleach compositions which comprise: from about 20% to about 50%, preferably 30% to 35%, by weight of peroxygen bleach; from 20% to 50%, preferably 30% to 35%, by weight of sodium sulfate; from 5% to 28%, preferably 10% to 15%, by weight of microfine, free-flowing starch; and from 5% to 28%, preferably 20% to 25%, by weight of microcrystalline cellulose are tableted in a standard die operating at a pressure of from about 200 psi to about 1000 psi.

A highly preferred bleach tablet prepared in the manner of this invention will consist essentially of: from about 10 grams to about 15 grams of diperazelaic acid (or the sodium salt thereof); from about 3 grams to about 6 grams of microfine, free-flowing starch; from about 7 grams to about 12 grams of microcrystalline cellulose; from about 10 grams to about 15 grams of sodium sulfate; from about 0.04 grams to about 0.08 grams of tetrasodium EDTA; and will additionally contain from about 0.2 grams to about 0.8 grams of magnesium stearate present as a tablet release aid. A typical tablet designed for laundry bath use will weigh about 44 grams, will be substantially circular in conformation, will have a diameter of about 2-¼ in. and will have a thickness which ranges from a center thickness of about ¾ in., tapering to a thickness at the edge of about ⅜ in.

The following examples illustrate the bleaching tablets of this invention and their preparation and usage, but are not intended to be limiting thereof. It will be appreciated, for example, that the compositions herein can be used in granular or powder form, but are especially adapted for tableting.

EXAMPLE I

A bleach tablet containing diperazelaic acid as the active bleaching agent is prepared in the following manner.

390 Pounds of 35% hydrogen peroxide are charged in a 200 gallon reactor and cooled to 5° C with −14° C cooling water. Concentrated sulfuric acid (95%-98%) is slowly added to the reactor with cooling. 150 Pounds of azelaic acid are added to the reactor over 1 hour. The reactor is held overnight (14 hours) at 19° C–22° C, with agitation. Approximately 100 gallons of cold, deionized water are added to the reactor over a period of 1.3 hours. The reactor mix is cooled to 7° C, the reactor is pressurized (4–9 psig) with nitrogen and filtered onto a filter press. The filter press is air blown for 7 hours.

The wet filter cake (approximately 28% solids) prepared in the foregoing manner is added to a Marion mixer containing sodium sulfate (ca. 1:1 wt. $Na_2SO_4$ to filter cake). The resulting product (1:1 diperazelaic acid/$Na_2SO_4$) has an available oxygen content of ca. 4.5%.

The air-dried diperazelaic acid/sodium sulfate mixture prepared in the foregoing manner is ground in a hammer mill to provide a homogeneous powdered bleach composition.

The powdered diperazelaic acid/sodium sulfate mixture prepared in the foregoing manner (14.8 lbs. ) is mixed with 5.2 lbs. of Avicel, 2.2 lbs. of STA-Rx 1500 starch and 0.2 lbs. of magnesium stearate. The foregoing mixture is placed in a Hobart mixer and mixed thoroughly to provide a homogeneous composition. The final mix has an average oxygen content of 3.89%.

44 Grams of the foregoing mixture are placed in a tablet die and compressed at 200–1000 psi. The bleach tablet produced is about 2-¼ in. in diameter, and has a center thickness of about ¾ in., tapering to about ⅜ in. thickness at the edges.

A bleach tablet prepared in the foregoing manner is placed in a standard, top-loading automatic washing machine together with 1.25 cups of a commercial built laundry detergent, ca. 9 lbs. of mixed fabrics and ca.

17–20 gallons of warm water (bath pH ca. 9.5). The bleach tablet rapidly disintegrates and disperses throughout the laundering bath. The machine is operated according to manufacturer's instructions for a ca. 10 minute washing cycle, after which the fabrics are rinsed and spun dry. After drying, the fabrics are found to be satisfactorily bleached.

EXAMPLE II

A bleach tablet containing perlauric acid as the active bleaching agent is prepared in the following manner.

Perlauric acid is prepared in well-known fashion in a manner analogous to that described in Example I. Thus, lauric acid, concentrated sulfuric acid and hydrogen peroxide are allowed to react for a period of about 14 hours. After work-up with deionized water and cooling, the resulting product is filtered and the wet filter cake is mixed with sodium sulfate at a ca. 1:1 weight ratio. This mixture is airdried and ground to provide a homogeneous bleaching powder.

The mixed sodium sulfate/perlauric acid bleaching powder is admixed with Avicel, STA-Rx 1500 and magnesium stearate (tablet release aid). Stable, quick-dissolving tablets are secured using 15 parts of the 1:1 perlauric acid/sodium sulfate mixture, 5 parts Avicel, 2 parts STA-Rx 1500 and 0.2 parts magnesium stearate.

The foregoing mixture is tableted in a standard die at a pressure of 200–1000 psi in the manner of Example I. The resulting tablet is storage stable and useful as a fabric bleach in an aqueous medium.

In the tablet of Example II the perlauric acid is replaced by an equivalent amount of perpelargonic acid; pertallow acid (not hydrogenated); 1,2-decanediperoxydicarboxylic acid; 1,12-diperdodecanedioic acid; 1,2-tetradec(3-)ene monoperoxydicarboxylic acid (prepared from dodecenyl succinic anhydride); and 1,2-tetradec(3-)ene diperoxydicarboxylic acid (derived from dodecenyl succinic anhydride), respectively, and stable bleaching tablets suitable for use in an aqueous fabric bleaching operation are secured.

EXAMPLE III

A bleach tablet stabilized with $NA_4EDTA$ is prepared as follows.

| Ingredient | % (wt.) |
|---|---|
| Diperazelaic acid | 33 |
| Sodium sulfate | 33 |
| Avicel | 21.3 |
| STA-Rx 1500 Starch | 11.4 |
| Magnesium stearate | 1 |
| $Na_4EDTA$ | 0.3 |

A composition of the foregoing type is mixed in a Hobart mixer to provide a final mix having an average oxygen content of 3.89%.

44 grams of the above mixture are placed in a tablet die and compressed at 200–1000 psi. The tablet produced is shelf stable and disintegrates without peroxide decomposition or excessive heat generation on contact with water.

The tablet of Example III is modified by replacing the $Na_4EDTA$ with an equivalent amount of sodium nitrilotriacetate, $Na_3EDTA$, and sodium citrate, respectively, and stable bleaching tablets are secured.

What is claimed is:

1. A bleach composition in tablet form, consisting essentially of:

a. a mixture of a solid peroxygen bleach and sodium sulfate, at a weight ratio of sodium sulfate:peroxygen bleach in the range from about 3:1 to about 1:3; and b. a mixture of microfine, free-flowing starch and microcrystalline cellulose, at a weight ratio of starch:cellulose in the range from about 5:28 to about 28:5, the weight ratio of the mixture of starch and cellulose to the mixture of peroxygen bleach and sodium sulfate being in the range from about 1:5 to about 1:2.

2. A composition according to claim 1 wherein the peroxygen bleach is a member selected from the group consisting of peroxyacids and diperoxyacids and the stable salts thereof.

3. A composition according to claim 2 wherein the peroxygen bleach is a member selected from the group consisting of diperazelaic acid, perlauric acid, perpalargonic acid, pertallow acid, 1,2-decane diperoxydicarboxylic acid, 1,12-diperdodecanedioic acid, 1,2-tetradec(3-)ene monoperoxydicarboxylic acid, 1,2-tetradec(3-)ene diperoxydicarboxylic acid, and the stable salts thereof.

4. A composition according to claim 3 wherein the peroxygen bleach is diperazelaic acid, or an alkali metal salt thereof.

5. A composition according to claim 4 consisting essentially of from about 20% to about 50% by weight of diperazelaic acid, or a salt thereof, from about 20% to about 50% by weight of sodium sulfate, from about 5% to about 28% by weight of microfine, free-flowing starch and from about 5% to about 28% by weight of microcrystalline cellulose.

6. A composition according to claim 1 additionally containing a chelating agent at a weight ratio of chelating agent:peroxygen bleach in the range from about 0.2:100 to about 3.0:100.

7. A composition according to claim 6 wherein the chelating agent is a member selected from the group consisting of ethylenediaminetetraacetic acid, ethane-1-hydroxy-1,1-diphosphonic acid, nitrilotriacetic acid, ethane-1-hydroxy-1,1,2-triphosphonic acid, citric acid, succinic acid, mellitic acid, benzene pentacarboxylic acid, and the water-soluble salts thereof.

8. A composition according to claim 6 wherein the chelating agent is a member selected from the group consisting of ethylenediaminetetraacetic acid, the water-soluble salts of ethylenediaminetetraacetic acid, and mixtures thereof, and wherein the peroxygen bleach is diperazelaic acid, or a salt thereof.

9. A bleach tablet especially adapted for use in an automatic washer, consisting essentially of: from about 10 grams to about 15 grams of diperazelaic acid, or the sodium salt thereof; from about 3 grams to about 6 grams of microfine, free-flowing starch; from about 7 grams to about 12 grams of microcrystalline cellulose; from about 10 grams to about 15 grams of sodium sulfate; from about 0.04 grams to about 0.08 grams of tetrasodium ethylenediaminetetraacetic acid; and from about 0.2 grams to about 0.8 grams of magnesium stearate.

10. A tablet according to claim 9 characterized by a thickness in the range from about 1 inch to about ¼ inch.

* * * * *

UNITED STATES PATENT OFFICE

CERTIFICATE OF CORRECTION

PATENT NO. : 4,013,581

DATED : March 22, 1977

INVENTOR(S) : Arthur Elmer Huber

It is certified that error appears in the above-identified patent and that said Letters Patent are hereby corrected as shown below:

Claim 2, line 18, delete "stable".

Signed and Sealed this

Thirty-first Day of May 1977

[SEAL]

*Attest:*

RUTH C. MASON
*Attesting Officer*

C. MARSHALL DANN
*Commissioner of Patents and Trademarks*